(12) United States Patent
Schat et al.

(10) Patent No.: US 12,047,489 B2
(45) Date of Patent: Jul. 23, 2024

(54) APPARATUS TO CRYPTOGRAPHICALLY PROVIDE A DIGITAL OUTPUT SIGNAL AS A RESPONSE TO A CHALLENGE

(71) Applicant: NXP B.V., Eindhoven (NL)

(72) Inventors: Jan-Peter Schat, Hamburg (DE); Andreas Lentz, Buchholz (DE); Fabrice Poulard, Houilles (FR)

(73) Assignee: NXP B.V., Eindhoven (NL)

( * ) Notice: Subject to any disclaimer, the term of this patent is extended or adjusted under 35 U.S.C. 154(b) by 337 days.

(21) Appl. No.: 17/451,198

(22) Filed: Oct. 18, 2021

(65) Prior Publication Data

US 2022/0158820 A1    May 19, 2022

(30) Foreign Application Priority Data

Nov. 17, 2020 (EP) .................................... 20306395

(51) Int. Cl.
*H04L 9/00* (2022.01)
*H04L 9/06* (2006.01)

(52) U.S. Cl.
CPC ........ *H04L 9/0631* (2013.01); *H04L 2209/16* (2013.01)

(58) Field of Classification Search
CPC ............... H04L 9/0631; H04L 2209/16; H04L 2209/08; H04L 9/003; G06F 21/46
See application file for complete search history.

(56) References Cited

U.S. PATENT DOCUMENTS 5,719,913 A * 2/1998 Maeno .................. G11C 19/00
377/69
2016/0371059 A1* 12/2016 Riou ...................... G06F 7/588

FOREIGN PATENT DOCUMENTS

DE           10149191 A1    4/2003

OTHER PUBLICATIONS

R. Karri, K. Wu, P. Mishra and Yongkook Kim, "Concurrent error detection schemes for fault-based side-channel cryptanalysis of symmetric block ciphers," pp. 1509-1517, Dec. 2002, doi: 10.1109/TCAD.2002.80 (Year: 2002).*

(Continued)

*Primary Examiner* — Daniel B Potratz
*Assistant Examiner* — Syed M Ahsan (57) ABSTRACT

An apparatus configured to: receive a digital input signal; receive a processing-direction-signal that can have a forward-value or a backward-value; and provide a digital output signal. The apparatus comprising a processor configured to apply an involutional cryptographic function to the digital input signal by: for a first operation: apply a first step of the involutional cryptographic function to the digital input signal in order to implement a forward calculation to move to the next step in the sequence; and perform a plurality of further operations until the forward calculation of a last step is performed. Each further operation comprises: if the processing-direction-signal has a forward-value: then perform the forward calculation for the current step; or if the processing-direction-signal has a backward-value: then perform a backward calculation for the current step.

10 Claims, 5 Drawing Sheets

(56) References Cited

OTHER PUBLICATIONS

Karri, Ramesh, et al. "Concurrent error detection schemes for fault-based side-channel cryptanalysis of symmetric block ciphers." IEEE Transactions on computer-aided design of integrated circuits and systems 21.12 (2002): 1509-1517. (Year: 2002).*

Dasu, Vishnu Asutosh et al., "LIGHTER-R: Optimized Reversible Circuit Implementation for SBoxes"; 32nd IEEE International System-On-Chip Conference; Sep. 3-6, 2019, Singapore.

Idzikowska, Ewa; "CED for Involutional Functions of PP-1 Cipher"; 2010 5th International Conference on Future Information Technology; May 21-23, 2010, Busan, Korea (South); DOI: 10.1109/FUTURETECH.2010.5482760.

Joshi-1, Nikhil et al.; "Concurrent error detection for involutional functions with applications in fault-tolerant cryptographic hardware design"; IEEE Transactions on Computer-Aided Design of Integrated Circuits and Systems; May 8, 2006, vol. 25, Issue: 6; DOI: 10.1109/TCAD.2005.855980.

Joshi-2, Nikhil et al.; "Concurrent Error Detection Schemes for Involution Ciphers"; Cryptographic Hardware and Embedded Systems—CHES 2004. CHES 2004; Lecture Notes in Computer Science, vol. 3156.

Karri, Ramesh et al.; "Concurrent Error Detection Schemes for Fault-Based Side-Channel Cryptanalysis of Symmetric Block Ciphers"; IEEE Transactions on Computer-Aided Design of Integrated Circuits and Systems; Dec. 16, 2002; vol. 21, No. 12.

Standaert, Francois-Xavier, et al.; "ICEBERG: an Involutional Cipher Efficient for Block Encryption in Reconfigurable Hardware"; Fast Software Encryption, 11th International Workshop, FSE 2004, Delhi, India, February 5 7, 2004; vol. 3017.

Táborský, Dominik et al., "Encryption and Reversible Computations"; Work-in-progress Paper, Aug. 22, 2018; Proceedings of the ICIAP: International Conference on Reversible Computation; Lecture Notes in Computer Science Book Series (LNCS, vol. 11106).

Yokoyama, Tetsuo; "Reversible Computation and Reversible Programming Languages;" Electronic Notes in Theoretical Computer Science; Mar. 4, 2010; vol. 253, Issue 6; https://doi.org/10.1016/j.entcs.2010.02.007.

* cited by examiner

APPARATUS TO CRYPTOGRAPHICALLY PROVIDE A DIGITAL OUTPUT SIGNAL AS A RESPONSE TO A CHALLENGE

CROSS-REFERENCE TO RELATED APPLICATIONS

This application claims priority under 35 U.S.C. § 119 to European Patent Application No. 20306395.3, filed on Nov. 17, 2020, the contents of which are incorporated by reference herein.

FIELD

The present disclosure relates to an apparatus that uses cryptography to provide a digital output signal that represents a response to a challenge, associated systems and methods.

SUMMARY

According to a first aspect of the present disclosure there is provided an apparatus configured to:
  receive a digital input signal;
  receive a processing-direction-signal that can have a forward-value or a backward-value; and
  provide a digital output signal;
  the apparatus comprising:
  a processor configured to apply an involutional cryptographic function to the digital input signal, wherein:
    the involutional cryptographic function comprises a sequence of processing steps,
    the sequence of processing steps comprises a first step, a last step and one or more intermediate steps, and
    the steps are reversible such that they can be performed in either:
      a forward direction in order to implement a forward calculation to move to the next step in the sequence; or
      a backward direction in order to implement a backward calculation to move to the preceding step in the sequence;
  wherein the processor is configured to:
    for a first operation: apply the first step of the involutional cryptographic function to the digital input signal in order to implement a forward calculation to move to the next step in the sequence; and
    perform a plurality of further operations until the forward calculation of the last step is performed, wherein each further operation comprises:
      if the processing-direction-signal has a forward-value: then perform the forward calculation for the current step to move to the next step in the sequence; or
      if the processing-direction-signal has a backward-value: then perform a backward calculation for the current step to move to the preceding step in the sequence; and
    provide the output of the forward calculation of the last step as the digital output signal when the difference between the number of forward calculations and backward calculations performed by the processor is a predetermined value.

Advantageously, such an apparatus can provide effective obfuscation of the side-channel signals.

In one or more embodiments the digital input signal represents a challenge;
and the digital output signal represents a response to the challenge.

In one or more embodiments the processor is configured to:
  perform the forward calculation for the current step to move to the next step in the sequence by performing a reversible calculation that is associated with the current processing step in a forward direction; and
  perform the backward calculation for the current step to move to the preceding step in the sequence by performing a reversible calculation that is associated with the preceding processing step in a reverse direction.

In one or more embodiments the apparatus is configured to set the value of the processing-direction-signal according to the output of a random number generator.

In one or more embodiments the apparatus also comprises the random number generator.

In one or more embodiments the random number generator is a true random number generator.

In one or more embodiments the random number generator is configured to set the processing-direction-signal such that it is more likely to have one of the forward-value or the backward-value than the other of the forward-value and the backward-value.

In one or more embodiments the apparatus further comprises a program counter configured to count the absolute number of operations taken for calculating the digital output signal. In response to the absolute number of operations reaching an operation-threshold value: the processor may be configured to implement calculations in a single direction for any further operations until the difference between the number of forward calculations and backward calculations performed by the processor is the predetermined value and the digital output signal has been calculated.

In one or more embodiments the apparatus comprises an S-box.

There is also disclosed a system configured to:
  receive a digital system input signal (that may represent a challenge);
  receive an apparatus-direction-signal that can have an apparatus-forward-value or an apparatus-backward-value; and
  provide a digital system output signal (that may represent a response to the challenge).

The system may be configured to apply a plurality of involutional cryptographic functions to the digital input signal in order to provide the digital system output signal. Each of the plurality of involutional cryptographic functions may be performed by any apparatus disclosed herein.

The plurality of involutional cryptographic functions may comprise a first involutional cryptographic function, a last involutional cryptographic function, and one or more intermediate involutional cryptographic functions.

The one or more involutional cryptographic functions can be performed in either:
  a forward cryptographic direction in order to implement a forward cryptographic calculation; or
  a backward cryptographic direction in order to implement an inverse of the forward cryptographic calculation.

The system may be configured to:
  perform a first apparatus-operation, wherein the first apparatus-operation comprises:
    if the apparatus-direction-signal has an apparatus-forward-value: then perform the involutional cryptographic function on the digital system input signal in the forward cryptographic direction in order to provide a digital apparatus output signal; or if the apparatus-direction-signal has an apparatus-backward-value: then perform the involutional cryptographic function on the digital system input signal in the backward cryptographic direction in order to provide a digital apparatus output signal.

The system may be configured to: perform a plurality of apparatus-operations, wherein each apparatus-operation comprises:
if the apparatus-direction-signal has an apparatus-forward-value: then perform the involutional cryptographic function on the digital apparatus output signal from the preceding apparatus-operation in the forward cryptographic direction to provide a new digital apparatus output signal; or
if the apparatus-direction-signal has an apparatus-backward-value: then perform the involutional cryptographic function on the digital apparatus output signal from the preceding apparatus-operation in the backward cryptographic direction to provide a new digital apparatus output signal.

The system may be configured to provide the digital apparatus output signal as the digital system output signal when the difference between the number of forward cryptographic calculations and backward cryptographic calculations is a predetermined value.

In one or more embodiments the system comprises a single one of any of the apparatuses disclosed herein, that is configured to sequentially perform each of the plurality of involutional cryptographic functions.

In one or more embodiments the system is configured to:
compare the two digital apparatus output signals from different apparatus-operations, wherein each of these two digital apparatus output signals are the result of, on balance, the same number of forward cryptographic calculations or backward cryptographic calculations; and
if the two digital apparatus output signals are not equal, then the system is configured to reapply the plurality of involutional cryptographic functions to the digital input signal in order to recalculate the digital system output signal.

In one or more embodiments the system comprises:
a first-apparatus comprising any apparatus disclosed herein, wherein the first-apparatus is configured to perform the involutional cryptographic function in the forward cryptographic direction in order to perform the forward cryptographic calculation;
a second-apparatus comprising any apparatus disclosed herein, wherein the second-apparatus is configured to perform the involutional cryptographic function in the backward cryptographic direction in order to perform the inverse of the forward cryptographic calculation;
wherein the apparatus-direction-signal is configured to define a first data flow path through one of first-apparatus and the second-apparatus such that the apparatus that is in the first data flow path contributes to calculating the digital system output signal.

In one or more embodiments the apparatus that is not in the first data flow path does not contribute to calculating the digital system output signal.

In one or more embodiments the system further comprises one or more multiplexers configured to selectively include either the first-apparatus or the second-apparatus in the first data flow path based on the apparatus-direction-signal.

There is also disclosed a computer-implemented method comprising:
receiving a digital input signal (that may represent a challenge);
receiving a processing-direction-signal that can have a forward-value or a backward-value;
for a first operation: applying a first step of an involutional cryptographic function to the digital input signal in order to implement a forward calculation to move to a next step in a sequence of processing steps; and
performing a plurality of further operations until a forward calculation of a last step is performed, wherein each further operation comprises:
if the processing-direction-signal has a forward-value: then performing a forward calculation for the current step to move to the next step in the sequence; or
if the processing-direction-signal has a backward-value: then performing a backward calculation for the current step to move to the preceding step in the sequence; and
providing the output of the forward calculation of the last step as a digital output signal when the difference between the number of forward calculations and backward calculations is a predetermined value (wherein the digital output signal may represent a response to the challenge).

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Smartcards and other ICs for secure authentication provide hard cryptography but are threatened by various types of side-channel attacks. Due to cost requirements, often only a few means against side-channel attacks are applied. Moreover, unknown attack mechanisms may appear.

Many side-channel attacks exploit the influence of the input code to features of supply current, probed voltage at internal nodes, electromagnetic emission, execution time etc. Many attack mechanisms are differential, i.e. different input codes are applied (often only varying by one bit), and the differences of the above-mentioned features of side-channel signals are observed. Such attack methods require obfuscating the side channel signals' features during the authentication process.

Authentication can use a cryptographic function f to calculate a response $\vec{R}$ to a given challenge $\vec{C}$, hence:

$$\vec{R} = f(\vec{C}) \qquad (\text{eq. 1})$$

The cryptographic function f can be involutional (i.e. its own inverse function), such that $f(f(\vec{R})) = \vec{R}$ or, in other words, $\vec{R} = f^{-1}(\vec{C}) = f(\vec{C})$. This also means $$\vec{C} = f(\vec{R}) \qquad (\text{eq. 2})$$

One class of these involutional cryptographic functions is Involutional Substitution-Permutation-Network block ciphers.

Use of a reversible algorithm allows two ways to calculate the response to the challenge. When the algorithm that is used to calculate the function f is reversible, it is possible to execute the function both in a forward and a backward direction. This is possible if each algorithm state and its successor state have a 1:1 relation, so that one cannot only conclude from any state to the next, but also to the previous one. A known output value can hence be used to step in a backward direction and calculate the corresponding input value. This allows calculating $\vec{R}$ not only (forward direction) using eq. 1, but also (backward) using eq. 2.

Further discussion of reversible functions can be found in "Reversible Computation and Reversible Programming Languages; Tetsuo Yokoyama; Electronic Notes in Theoretical Computer Science 253 (2010) 71-81".

Figure 1:
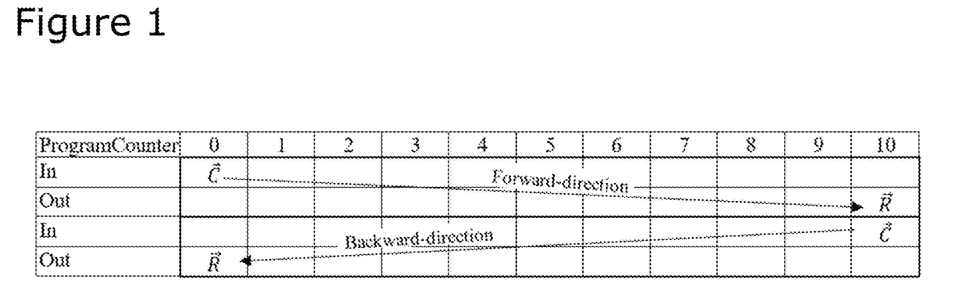
FIG. 1 shows schematically the calculation of a response ($\vec{R}$) to a challenge ($\vec{C}$): in the upper half, the calculation is performed in the forward direction, in the lower half of the Figure, the calculation is performed in the backward direction.

FIG. 1 shows schematically the calculation of a response ($\vec{R}$) to a challenge ($\vec{C}$) in the forward direction, and also the calculation of a response ($\vec{R}$) to a challenge ($\vec{C}$) in the backward direction. In this example, the calculation/conversion requires 10 processing steps over 10 command cycles (through 10 successive processing states), as illustrated by the program counter. Each command cycle may be executed over one or more clock cycles. Also, it some examples it may be possible to execute a plurality of command cycles in one clock cycle.

As the computation of f is reversible, it is not only possible to process either all calculation steps in the forward direction or all in the backward direction—but it is also possible to take e.g. a few steps in the forward direction, then to take one step back—hence reversing the previous calculation step—and then to proceed in the forward direction again, such that the original processing direction is resumed.

Figure 2:
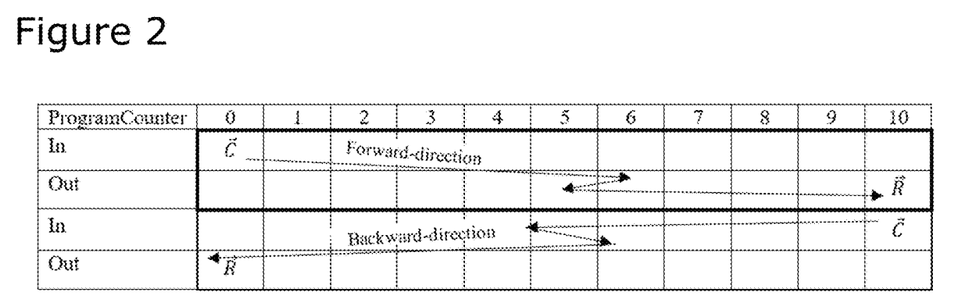
FIG. 2 shows schematically the calculation of a response ($\vec{R}$) to a challenge ($\vec{C}$): the upper half of the Figure, the calculation is performed in the forward direction during which one step is performed in the backward direction and in the lower half of the Figure, the calculation is performed in the backward direction with one step is performed in the forward direction.

FIG. 2 shows schematically the calculation of a response ($\vec{R}$) to a challenge ($\vec{C}$) in the forward direction during which one step is performed in the backward direction before processing then continues in the forward direction until the response is calculated. FIG. 2 also shows the calculation of a response ($\vec{R}$) from a challenge ($\vec{C}$) in the backward direction, during which one step is performed in the forward direction before processing is continued in the backward direction until the response is calculated. In the example of FIG. 2, the complete calculation/conversion from response ($\vec{R}$) to challenge ($\vec{C}$) requires processing steps over 12 command cycles. This is because the processing when the program counter has the value of 5 and 6, when the processing direction is reversed, is performed more than once. For example the two command cycles can be performed twice, or a single command cycle can be performed three times—once in the forward direction, once in the backward direction, and then again in the forward direction.

This procedure can advantageously provide effective obfuscation of the side-channel signals, especially if the forward and backward steps are performed in random order. In this way, the order and number of the processing steps that are preformed to calculate the response $\vec{R}$ can be different from one calculation to the next.

Figure 3:
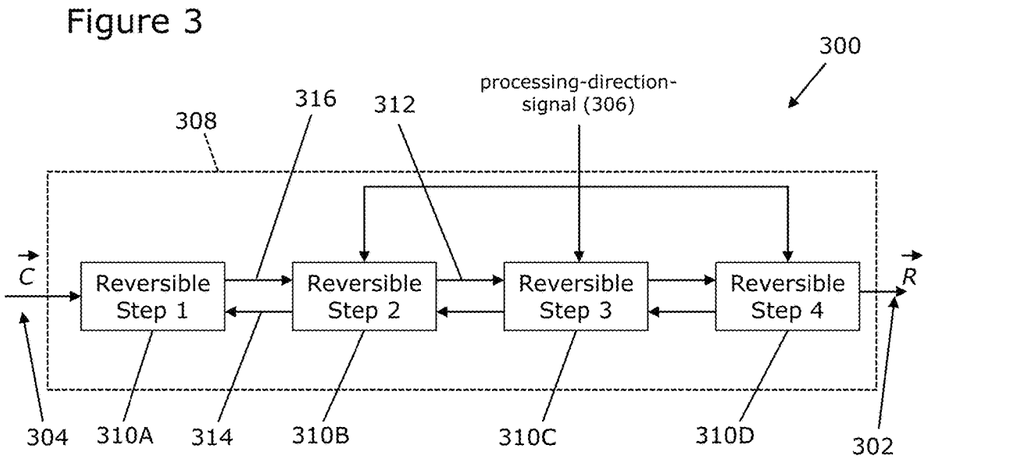
FIG. 3 shows an example embodiment of an apparatus for applying an involutional cryptographic function to a challenge $\vec{C}$ in order to calculate a response $\vec{R}$.

FIG. 3 shows an example embodiment of an apparatus 300 for applying an involutional cryptographic function to a challenge $\vec{C}$ in order to calculate a response $\vec{R}$. The apparatus 300 may be implemented as an S-box (substitution-box).

The apparatus 300 receives a digital input signal 304 that represents the challenge, and provides a digital output signal 302 that represents the response to the challenge. It will be appreciated that the terms "challenge" and "response" can relate to signals in an authentication process. Examples disclosed herein, including the apparatus 300 of FIG. 3, are not restricted to authentication processes. For instance, examples disclosed herein can be used for encryption/decryption purposes, depending upon the nature of the underlying involutional cryptographic function. Therefore the digital input and output signals disclosed herein may comprise plaintext/ciphertext.

The apparatus 300 also receives a processing-direction-signal 306 that can have a forward-value or a backward-value. As will be discussed in detail below, the processing-direction-signal 306 is used to control the direction in which a plurality of processing steps 310A, 310B, 310C, 310D are performed when applying the involutional cryptographic function.

The apparatus 300 includes a processor 308 that can apply the involutional cryptographic function to the digital input signal 304. The processor 308 can also be referred to as a cryptoprocessor. As discussed above, the involutional cryptographic function comprises a sequence of processing steps. In the example of FIG. 2 there are 10 steps. In the example of FIG. 3 there are four processing steps 310A-D consisting of: a first step 310A, a last step 310D and a plurality (in this example two) intermediate steps 310B, 310C. All of the steps 310A-310D are reversible such that they can be performed in either a forward direction or a backward direction.

In a forward direction, a processing step 310A-310D implements a forward calculation to move to the next step in the sequence. An example of moving from the first step 310A to the second step 310B is labelled with reference 316 in FIG. 3.

In a backward direction, a processing step 310A-310D implements a backward calculation to move to the preceding step in the sequence. An example of moving from the second step 310B to the first step 310A is labelled with reference 314 in FIG. 3.

As will be discussed below, the application of the involutional cryptographic function involves performing a plurality of operations as the plurality of processing steps are applied to calculate the response $\vec{R}$. The number of operations required to apply the involutional cryptographic function can be varied by changing the direction of the reversible functions that are applied, as shown in FIG. 2.

For a first operation, the processor 308 applies the first step 310A of the involutional cryptographic function to the digital input signal 304 in order to implement a forward calculation to move to the next step in the sequence. In this example, the first processing step 310A is always performed in a forward direction because there is no preceding/earlier step to go back to.

Then a plurality of further operations are performed until the forward calculation of the last step 310D is performed, and therefore the response $\vec{R}$ 302 has been calculated. The processing that is performed by the processor 308 for the further operations will depend upon the value of the processing-direction-signal 306. As will be discussed below, the value of the processing-direction-signal 306 can be set randomly such that the number of operations required to calculate the response $\vec{R}$ is also random. Advantageously, this can make it more difficult for an attacker to intercept the response $\vec{R}$.

For each further operation: if the processing-direction-signal 306 has a forward-value, then the processor 308 performs the forward calculation for the current step to move to the next step in the sequence. Taking the first of the plurality of further operations as an example (which is the processing performed at second processing step 310B, in the second operation in calculating the overall response $\vec{R}$ for a given challenge $\vec{C}$), if the processing-direction-signal 306 has a forward-value then the second processing step 310B performs the forward calculation to move to the third processing step 310C in the sequence (this transition is illustrated with reference 312 in the drawing).

Alternatively, if the processing-direction-signal 306 has a backward-value in a further operation: then the processor 308 performs a backward calculation for the current step to move to the preceding step in the sequence. Again, taking the first of the plurality of further operations as an example, if the processing-direction-signal 306 has a backward-value then the second processing step 310A performs the backward calculation to move back to the first processing step 310A in the sequence (this transition is illustrated with reference 314 in the drawing).

Continuing to take the second processing step 310B as an example, performing the forward calculation for the second processing step 310B may involve performing a reversible calculation that is associated with the second processing step 310B (i.e. the current processing step) in a forward direction. Performing the backward calculation for the second processing step 310B may involve performing a reversible calculation that is associated with the first processing step 310BA (i.e. the preceding processing step) in a backward/reverse direction.

The processor 308 can then provide the output of the forward calculation of the last step 310D as the digital output signal $\vec{R}$ 302. In this way, when the difference between the number of forward calculations and backward calculations performed by the processor 308 is a predetermined value, the output of the last step 310D is the digital output signal $\vec{R}$ 302. In the example of FIG. 3 the output of the last step 310D is the digital output signal $\vec{R}$ 302 when the difference between the number of forward calculations and backward calculations is 4. In the example of FIG. 2, the output of the last step is the digital output signal $\vec{R}$ when the difference between the number of forward calculations and backward calculations is 10. The processor 308 can maintain a count of the number of forward calculations minus backward calculations during the plurality of operations, and then recognise that the involutional cryptographic function has been completed when the count reaches the predetermined value. Such a count may be available as the program counter shown in FIG. 4 is incremented or decremented.

Figure 4:
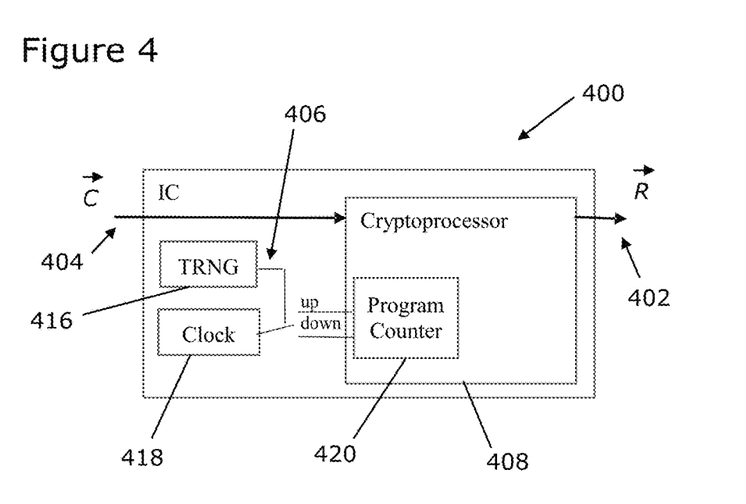
FIG. 4 shows an apparatus according to an embodiment of the present disclosure.

FIG. 4 shows an apparatus 400 according to an embodiment of the present disclosure. The apparatus 400 in this example is implemented as a smartcard integrated circuit (IC) with a true random number generator (TRNG) 416, a clock generator 418 and a cryptoprocessor 408 with a program counter 420.

The apparatus 400 receives a digital input signal 404 that represents a challenge, and provides a digital output signal 402 that represents a response to the challenge. The digital input signal 404 is provided as an input to the cryptoprocessor 408. The cryptoprocessor 408 applies one of a sequence of processing steps in accordance with the value of the program counter 420. That is: when the program counter 420 has a value of 1, it performs the first processing step in the sequence; when the program counter 420 has a value of 2, it performs the second processing step in the sequence, etc.

The clock generator 418 providers a clock signal that has a value that periodically changes between a high and low value, thereby providing periodic rising and falling edges in the clock signal. This clock signal is provided to either: an up-input-terminal of the program counter 420; or a down-input-terminal of the program counter 420. The program counter can be configured to respond to either the rising or falling edges of the clock signal such that: in response to a rising or falling edge of the clock signal at the up-input-terminal, the count of the program counter 420 is incremented; and in response to a rising or falling edge of the clock signal at the down-input-terminal, the count of the program counter 420 is decremented. In this way: a forward calculation is performed in response to the clock signal being provided to the up-input-terminal; and a backward calculation is performed in response to the clock signal being provided to the down-input-terminal.

In this example the TRNG 416 provides a randomly generated output signal that controls whether the clock generator 418 is connected to the up-input-terminal or the down-input-terminal of the program counter 420. In this way, the randomly generated output signal can be considered as a processing-direction-signal that can have either: i) a forward-value (when it connects the clock generator 418 to the up-input terminal of the program counter 420); or a backward-value (when it connects the clock generator 418 to the down-input terminal of the program counter 420).

The TRNG 416, or any other type of random number generator, can be considered as providing a flag to reverse the incrementing/decrementing of the program counter 420. The TRNG 416 can be based on a physical entropy source like a noise generator. This is in contrast to a Pseudo-Random Number Generator that uses e.g. a linear feedback shift register (LFSR) with a certain seed, to provide a bitstream that has a random statistics, but is deterministic with respect to the seed.

In some examples, the TRNG 416 can provide a biased randomly generated output signal such that the processing-direction-signal is more likely to have one of the forward-value than the backward-value. For instance, the TRNG 416 can be configured such that overall the processing-direction-signal is 80% more likely to have a forward-value than a backward-value when performing the involutional cryptographic function in a forward direction. Similarly, the TRNG 416 can be configured such that overall the processing-direction-signal is 80% more likely to have a backward-value than a forward-value when performing the involutional cryptographic function in a backward direction. In this way, the apparatus 400 is likely to calculate the response to the challenge in a reasonable number of operations for a given application.

Furthermore, the program counter 420 can count the absolute number of operations taken for calculating the response to the challenge (irrespective of whether they are forward or backward), and in response to the absolute number of steps reaching an operation-threshold value (e.g. 20), then the apparatus 400 implements calculations in a single direction for any further operations until the difference between the number of forward calculations and backward calculations performed by the processor is a predetermined value and the response has been calculated. In this way, if the involutional cryptographic function is being performed in a forward direction, the apparatus 400 can perform calculations in only a forward direction for any further operations. Similarly, if the involutional cryptographic function is being performed in a backward direction, the apparatus 400 can implement calculations in only a backward direction for any further operations.

Advantageously the processing that is described with reference to FIGS. 2 to 4 can reinforce the obfuscation of the calculation of the response to a challenge, and can especially defy side-channel attacks. This is because randomly processing steps in either the forward way or the backward way can result in substantially different side-channel signals.

The obfuscation described so far is based on using one module/apparatus to perform the cryptographic function. As indicated above, this module/apparatus can be implemented as a "Substitution Box" ("S-Box"). I.e. one module implemented on an IC or in a cryptoprocessor. As described, the calculation of the cryptographic function is performed with a mixture of steps in the forward and in the backward direction; hence this can already be expected to deliver a high extent of obfuscation: the side channel signals do not only depend on key and message, but also to a large extent on the (forward/backward) path through the algorithm as chosen by a Random Generator.

Figure 5:
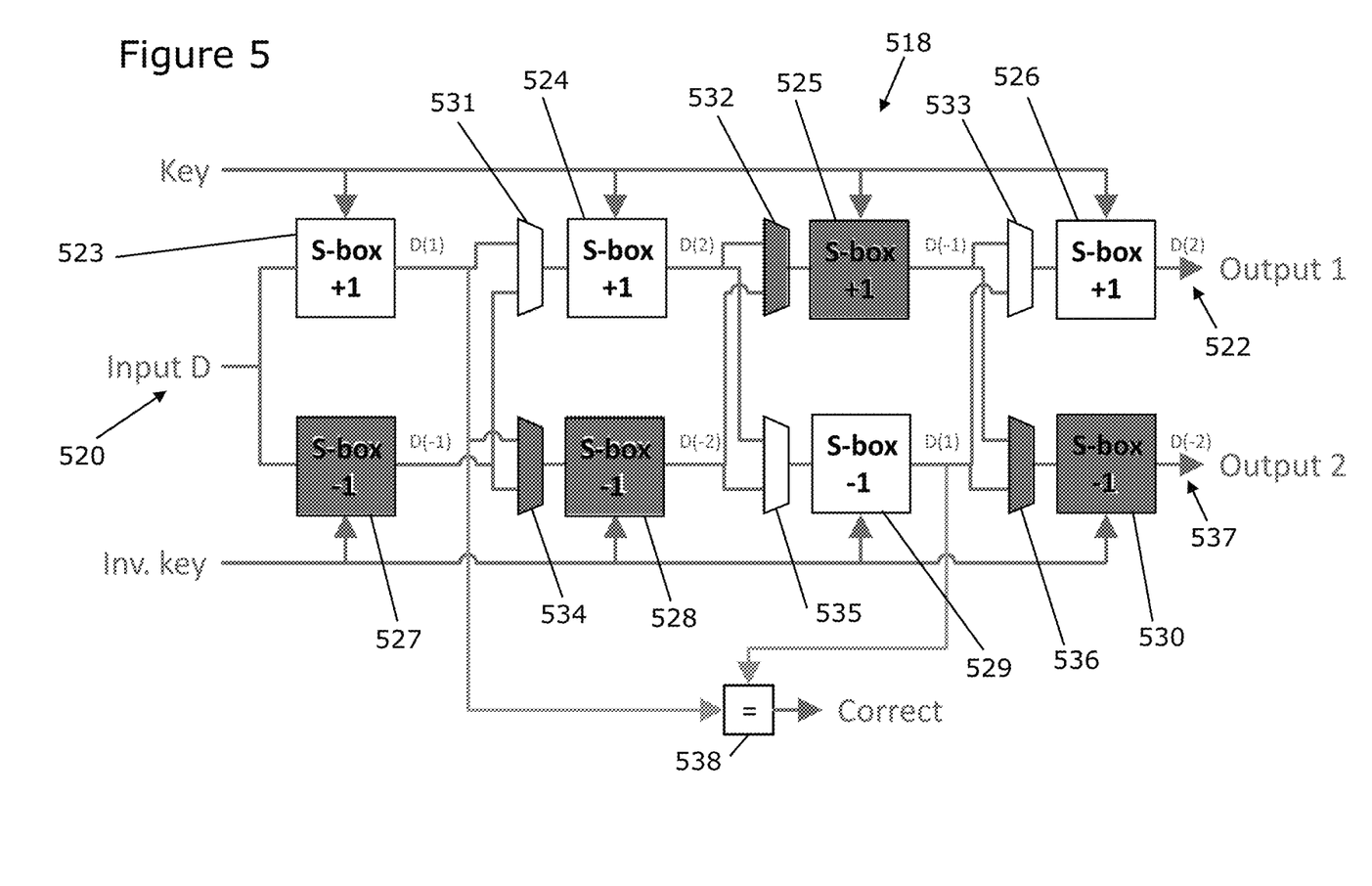
FIG. 5 shows an example embodiment of a system that implements the processing of a plurality of the apparatuses of FIG. 4.

To even further increase the degree of obfuscation, FIG. 5 shows an example embodiment of a system 518 that implements the processing of a plurality of the apparatuses of FIG. 3. The system 518 receives a digital system input signal 520 that represents a challenge, and provides a digital system output signal 522 that represents a response to the challenge. As will be discussed in detail below, the system 518 sequentially applies a plurality of involutional cryptographic functions to the digital system input signal 520 in order to determine the digital system output signal 522. For instance, the digital system output signal 522 in FIG. 5 is required to be the result of the involutional cryptographic function being applied sequentially to the digital system input signal 520 twice in a forward direction.

In FIG. 5 the processing of eight apparatuses of FIG. 4 is shown, with the processing of each apparatus illustrated as a box that is labelled as either "S-box+1" or "S-box −1". However, not all of these apparatuses/S-boxes are used in calculating the digital system output signal 522.

An apparatus labelled as "S-box+1" represents an involutional cryptographic function being performed in a forward cryptographic direction in order to implement a forward cryptographic calculation. (A forward cryptographic calculation is shown schematically in the top half of FIG. 2 as a "Forward-direction".) An apparatus labelled as "S-box −1" represents an involutional cryptographic function being performed in a backward cryptographic direction in order to implement an inverse of the forward cryptographic calculation. (The inverse of the forward cryptographic calculation is shown schematically in the bottom half of FIG. 2 as a "Backward-direction".)

As will be recalled from the description of FIGS. 3 and 4, the processing within each S-box involves a plurality of operations to perform a sequence of processing steps and apply an involutional cryptographic function. The processing of FIG. 5 involves the application of a plurality of apparatus-operations, wherein for each apparatus-operations the apparatus of FIGS. 3 and 4 applies an involutional cryptographic function in either a forward cryptographic direction or a backward cryptographic direction. Once the required number of apparatus-iterations have been applied, the output from the last iteration is the digital system output signal. This can be considered as a nested loop: a first loop comprising a plurality of operations that is performed within a single apparatus/S-box; and a second loop comprising a plurality of apparatus-iterations, wherein the first loop is performed for each of the apparatus-operations of the second loop.

Turning now to FIG. 5 in detail, the system 518 can apply a plurality of involutional cryptographic functions to the digital system input signal 520 in order to provide the digital system output signal 522. Each of the plurality of involutional cryptographic functions is performed by the apparatus of FIG. 3 or FIG. 4. The application of an involutional cryptographic function is illustrated graphically in FIG. 5 as an S-box 523-530.

In this example, the S-boxes 523-530 are provided in pairs, with each pair including: (i) an S-box (labelled as S-box+1) 523-526 for performing the involutional cryptographic function in a forward cryptographic direction in order to implement a forward cryptographic calculation; and (ii) an S-box (labelled as S-box −1) 527-530 for performing the involutional cryptographic function in a backward cryptographic direction in order to implement an inverse of the forward cryptographic calculation. In this way, an S-box pair can be considered as having a first-S-box (which is an example of a first-apparatus) and a second-S-box (which is an example of a second-apparatus). Irrespective of whether an S-box 523-530 performs a forward or backward cryptographic function, the output of the S-box 523-530 will be referred to as a digital apparatus output signal.

As will be discussed in more detail below, the functionality of FIG. 5 can further increase the degree of obfuscation. Again, the functionality of FIG. 5 is based on the involutional nature of the cryptographic function. Assuming e.g. that traversing the S-box twice is intended such that the digital system output signal 522 represents the involutional cryptographic function being performed sequentially on the digital system input signal 520 twice then this can be achieved in a number of ways, including one of the following three paths through a plurality of S-boxes:

First going through an S-Box three times in forward direction (3×S-box +1), and then once in backward direction (1×S-box −1).

Going through an S-Box twice in forward direction. (2×S-box+1)

First going through an S-Box once in backward direction (1×S-box −1), then three times in forward direction (3×S-box+1).

In FIG. 5 there are four pairs of S-boxes 523-530, arranged sequentially such that there is a first S-box pair 523, 527, a last S-box pair 526, 530, and one or more intermediate S-box pairs 524, 528, 525, 529. Each S-box pair provides two digital apparatus output signals. For the first and the intermediate S-box pairs, the two digital apparatus output signals are provided as input signals to the next S-box pair. For the last S-box pair, one of the two digital apparatus output signals is provided as the digital system output signal 522. The first S-box pair 523, 527 receives the digital system input signal 520 as their input signals.

The system 518 includes a plurality of multiplexers 531-536. For each of the S-boxes in the intermediate and last S-box pairs, a multiplexer 531-536 can selectively couple the digital apparatus output signal from one of the two S-boxes in a preceding S-box pair to the input of the S-box. In this way, the multiplexers 531-536 can be set such that they control the flow of data through the S-boxes such that the digital system input signal 520 (that is provided to the first S-box pair 523, 527) is processed in such a way that a digital apparatus output signal of one the S-boxes of the last S-box pair 526, 530 has, on balance, been processed by the required number of involutional cryptographic functions and therefore correctly represents the required digital system output signal 522. That is, the required digital system output signal 522 is achieved when the difference between the number of inverse calculations and the number of forward cryptographic calculations matches a target value.

Although not shown in FIG. 5, each of the multiplexers is controlled based on an apparatus-direction-signal. Such an apparatus-direction-signal can have an apparatus-forward-value or an apparatus-backward-value. An apparatus-direction-signal having an apparatus-forward-value will cause the digital apparatus output signal from the preceding S-box pair to be connected to the input of an S-box that implements a forward cryptographic calculation (S-box +1). An apparatus-direction-signal having an apparatus-backward-value will cause the digital apparatus output signal from the preceding S-box pair to be connected to the input of an S-box that implements the inverse of the forward cryptographic calculation (S-box −1). In this way, each of the multiplexers 531-536 can be set such that the digital input signal 520 follows an appropriate data path through a plurality of S-boxes in order to provide the required digital system output signal 522.

In FIG. 5, the multiplexers 531-536 have been set to define: a first data flow path through the S-boxes and also a second data flow path through the S-boxes. The components that are included in the first data flow path are shown unfilled. The components that are included in the second data flow path are shown with a dotted pattern. In this way, one or more multiplexers 531-536 can selectively include either a first-S-box of an S-box pair or a second-S-box of the S-box pair in the first data flow path based on the apparatus-direction-signal.

The first data flow path has the digital input signal 520 as an input, and provides the digital system output signal 522. The first data flow path includes one of the S-boxes in each S-box pair (in FIG. 5, the S-boxes with references 523, 524, 529, 526) and also three of the multiplexers (in FIG. 5, the multiplexers with references 531, 535, 533). The digital apparatus output signal of each S-box in the first data flow path is labelled as D(n), where n is incremented if the S-box performs a forward cryptographic calculation. Similarly, n is decremented if the S-box performs the inverse of the forward cryptographic calculation. In this way, the value of n at the end of the processing (for example when the digital system output signal 522 is provided) represents the difference between the number of forward cryptographic calculations and backward cryptographic calculations. This difference may be required to be a predetermined/target value in order for the system 518 to perform the required processing for any particular application.

The second data flow path has the digital input signal 520 as an input, and provides a secondary digital system output signal 537. In this example the digital system output signal 537 is not directly required for determining the response to a challenge, although as will be discussed below its generation can be useful for verifying the correctness of the digital system output signal 537. The second data flow path includes the other of the S-boxes in each S-box pair (in FIG. 5, the S-boxes with references 527, 528, 525, 530) and also the other three multiplexers (in FIG. 5, the multiplexers with references 534, 532, 536).

As indicated above, the system of FIG. 5 can be considered as performing a plurality of apparatus-operations to calculate the digital system output signal 522. As it is shown in FIG. 5, each of these apparatus-operations is sequentially performed by one of the S-box pairs. More specifically, each apparatus-operation can be sequentially performed by one of the S-boxes of one of the S-box pairs.

In a first apparatus-operation:
a) the S-box labelled as 523 performs the involutional cryptographic function on the digital system input signal in the forward cryptographic direction in order to provide a digital apparatus output signal; and
b) the S-box labelled as 527 performs the involutional cryptographic function on the digital system input signal in the backward cryptographic direction in order to provide a digital apparatus output signal.

The digital apparatus output signal can be considered as an intermediate output signal that is part of the overall calculation of the digital system output signal 522.

The value of the apparatus-direction-signal will define which of these two digital apparatus output signals (provided by either S-box 523 or S-box 527) will be processed in the next apparatus-iteration. If the apparatus-direction-signal has an apparatus-forward-value, then the digital apparatus output signal that is calculated as a forward cryptographic calculation by S-box 523 will be used in the next apparatus-iteration as part of the process in calculating the digital system output signal 522. If the apparatus-direction-signal has an apparatus-backward-value, then the digital apparatus output signal that is calculated as an inverse of the forward cryptographic calculation by S-box 527 will be used in the next apparatus-operation on the way to calculating the digital system output signal 522. In this example, the apparatus-direction-signal has an apparatus-forward-value for the first apparatus-iteration such that the settings of the multiplexers incorporate S-box 523 into the first data flow path that culminates with providing the digital system output signal 522). That is, a digital apparatus output signal that is the result of the involutional cryptographic function on the digital system input signal in the forward cryptographic direction will be used as an input signal for the next apparatus-iteration on the way to calculating the digital system output signal 522.

In an alternative implementation that is described below, where a single configurable S-box is used instead of the first S-box pair, the configurable S-box may be configured to perform the processing of only one of a) and b) based on the value of the apparatus-direction-signal.

Returning to FIG. 5, the processing of the second apparatus-iteration is performed by one of the S-boxes of the second S-box pair 524, 528. Two multiplexers 531, 534 are included such that they can selectively connect the digital apparatus output signal from either of the S-boxes 523, 527 of the first S-box pair to the input of either of the S-boxes 524, 528 of the second S-box pair. In this example, the apparatus-direction-signal has an apparatus-forward-value for the second apparatus-iteration such that multiplexer 531 incorporates S-box 524 into the first data flow path.

The processing of the third apparatus-operation is performed by one of the S-boxes of the third S-box pair 525, 529. Two multiplexers 532, 535 are included such that they can selectively connect the digital apparatus output signal from either of the S-boxes 524, 528 of the second S-box pair to the input of either of the S-boxes 525, 529 of the third S-box pair. In this example, the apparatus-direction-signal has an apparatus-backward-value for the third apparatus-operation such that multiplexer 535 incorporates S-box 529 into the first data flow path.

The processing of the last/fourth apparatus-iteration is performed by one of the S-boxes of the last/fourth S-box pair 526, 530. Two multiplexers 533, 536 are included such that they can selectively connect the digital apparatus output signal from either of the S-boxes 525, 529 of the third S-box pair to the input of either of the S-boxes 526, 530 of the last/fourth S-box pair. In this example, the apparatus-direction-signal has an apparatus-forward-value for the last/fourth apparatus-iteration such that multiplexer 533 incorporates S-box 526 into the first data flow path. Therefore, the digital apparatus output signal of S-box 526 is provided as the digital system output signal 522. The functionality of the second to fourth apparatus-operation, that contributes to the calculation of the digital system output signal 522, can be summarised as follows:
- if the apparatus-direction-signal has an apparatus-forward-value: then the apparatus-iteration involves performing the involutional cryptographic function on the digital apparatus output signal from the preceding apparatus-iteration in the forward cryptographic direction to provide a new digital apparatus output signal; or
- if the apparatus-direction-signal has an apparatus-backward-value: then then the apparatus-iteration involves performing the involutional cryptographic function on the digital apparatus output signal from the preceding apparatus-iteration in the backward cryptographic direction to provide a new digital apparatus output signal.

The digital apparatus output signal is then provided as the digital system output signal 522 when the difference between the number of forward cryptographic calculations and backward cryptographic calculations is a predetermined value.

In some examples, the states of the multiplexers 531-536 may be hard-coded for the number of involutional cryptographic functions that are to be applied sequentially to the digital system input signal 520 to calculate the digital system output signal 522. In other examples, the system 518 may be configured to randomly select one of a plurality of predetermined multiplexer-configurations that will correctly calculate the digital system output signal 522. For instance, the system 518 may have access to memory that stores a plurality multiplexer-configurations (which each define the state of the plurality of multiplexers), and the system can select one of these multiplexer-configurations that is associated with a target-output-signal. The target-output-signal can represent the "predetermined value" that is required to be the difference between the number of forward cryptographic calculations and backward cryptographic calculations for the required response to the challenge.

It will be appreciated that in other examples, it may not be necessary to implement the S-boxes as S-box pairs. Instead, a single configurable S-box can be used instead of an S-box pair. Such a configurable S-box can be configured to implement: (i) a forward cryptographic calculation; or (ii) an inverse of the forward cryptographic calculation; based on the apparatus-direction-signal. In which case, the system can be considered as applying a plurality of involutional cryptographic functions to the digital input signal, wherein the plurality of involutional cryptographic functions comprises a first involutional cryptographic function (provided by a single S-box that replaces the first S-box pair 523, 527 that is shown in FIG. 5), a last involutional cryptographic function (provided by a single S-box that replaces the last S-box pair 526, 530 that is shown in FIG. 5), and one or more involutional cryptographic functions (provided by two sequentially connected S-boxes that replace the two sequentially connected intermediate S-box pair 524, 528, 525, 529 that are shown in FIG. 5).

Further still, a single configurable S-box can be used instead of all of the individual S-boxes 523-530 of FIG. 5. In which case, the output of the S-box is connected to its input such that it can sequentially apply the involutional cryptographic function in either the forward or backward cryptographic direction, depending upon the state of the apparatus-direction-signal, until the difference between the number of forward cryptographic calculations and backward cryptographic calculations is the predetermined value.

For such examples, the state of the apparatus-direction-signal can be set by a random number generator in the same as described above for the processing-direction-signal.

An additional feature of the configuration shown in FIG. 5 is that it can enable online verification for correctness of the calculation of the digital system output signal 522. This is indicated in FIG. 5 by the error checking function 538, and its "Correct" output signal. This verification is possible, because the same digital apparatus output signals (outputs of individual S-boxes) can be obtained by two different paths through the S-boxes. In the example of FIG. 5, the digital apparatus output signal of one of the S-boxes of the first S-box pair (the S-box labelled as 523) should be the same as the digital apparatus output signal of one of the S-boxes of the third S-box pair (the S-box labelled as 529). More particularly, each of these two S-boxes 523, 529 should have a digital apparatus output signal that represents a single forward cryptographic calculation (D(1)). If the error checking function 538 determines that the digital apparatus output signals that should eb the same are not the same, then it can set the "Correct" output signal to an error value. In response, the system 518 can recalculate the digital system output signal 522.

More generally, the system 518 can compare the two digital apparatus output signals from different operations, wherein each of these two digital apparatus output signals are the result of, on balance the same number of forward cryptographic calculations or backward cryptographic calculations. By "on balance", it will be appreciated that this means that the difference between the number of forward and backward cryptographic calculations is the same for each of the two digital apparatus output signals. If the two digital apparatus output signals are not equal, then the system 518 can reapply the plurality of involutional cryptographic functions to the digital input signal 520 in order to recalculate the digital system output signal 522.

This feature makes using the technique of sub-threshold computing attractive—in this technique, the supply voltage is reduced to approximately half of the nominal supply voltage (or approximately twice the MOSFETs' threshold voltage vt). This reduced supply voltage has two effects:

- It strongly decreases voltage swings, slew rates and supply power spikes—and hence it strongly decreases the amplitude of most side-channel signals.
- It increases the bit error rate (which may be acceptable, given the mentioned check for correctness and the possibility to repeat the calculation in case an error has been detected).

Figure 6:
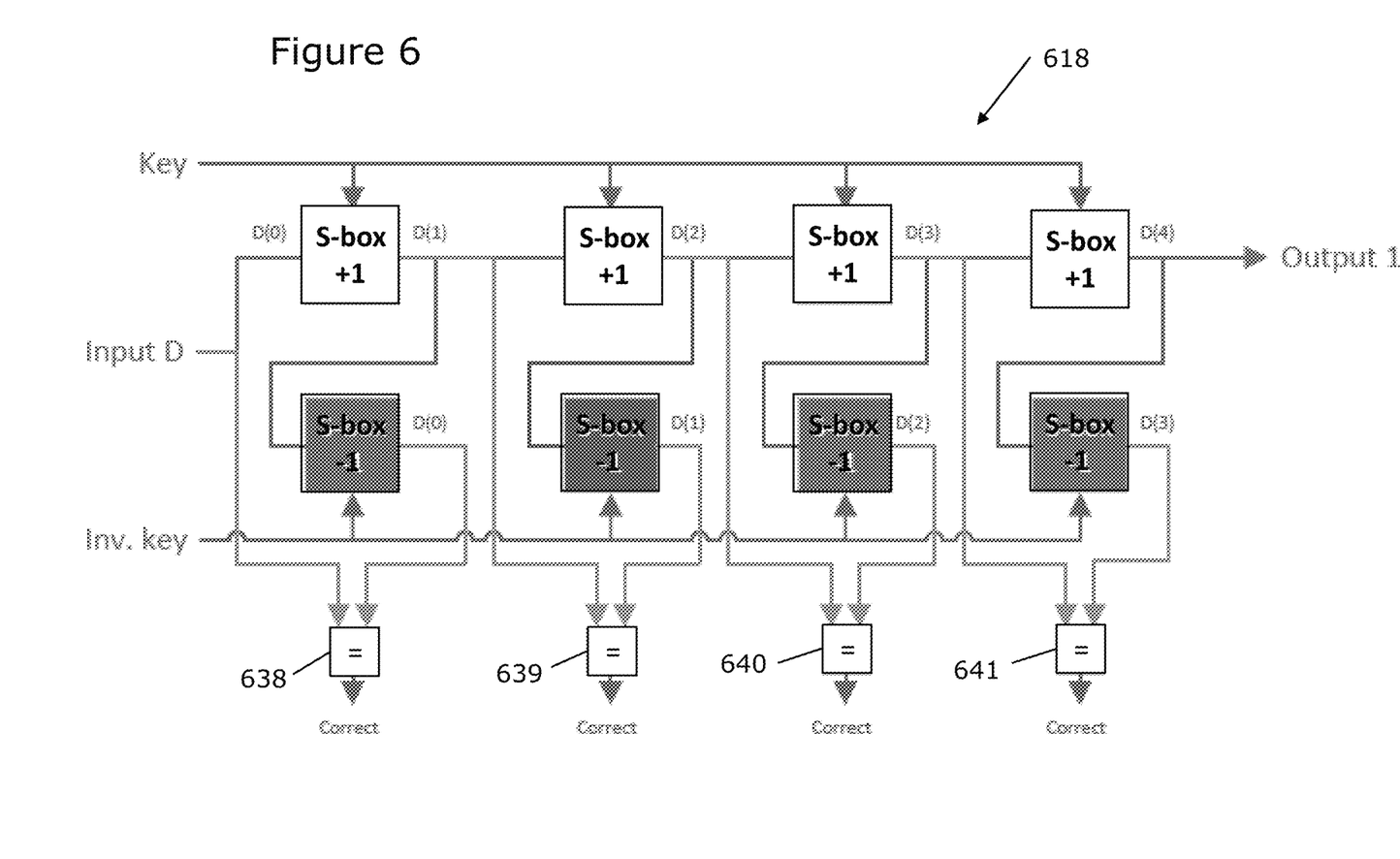
FIG. 6 shows an alternative implementation of a system with two complementary Substitution-box paths.

FIG. 6 shows an alternative implementation of a system 618 with two complementary S-box paths. This implementation is based on S-boxes which each can be run in either a forward or a backward direction (in the same way as shown in FIG. 4). The system 618 can include a plurality of error checking functions 638-640 for helping to identify whether or not there has been an error in calculating a result of any of the involutional cryptographic functions, and if there has been then instructing the response to be recalculated. This on-line error checking can enable sub-threshold computing to be used because the higher risk of errors can be mitigated by the ability to identify those errors and take remedial action of recalculating the response until no error is identified.

Figure 7:
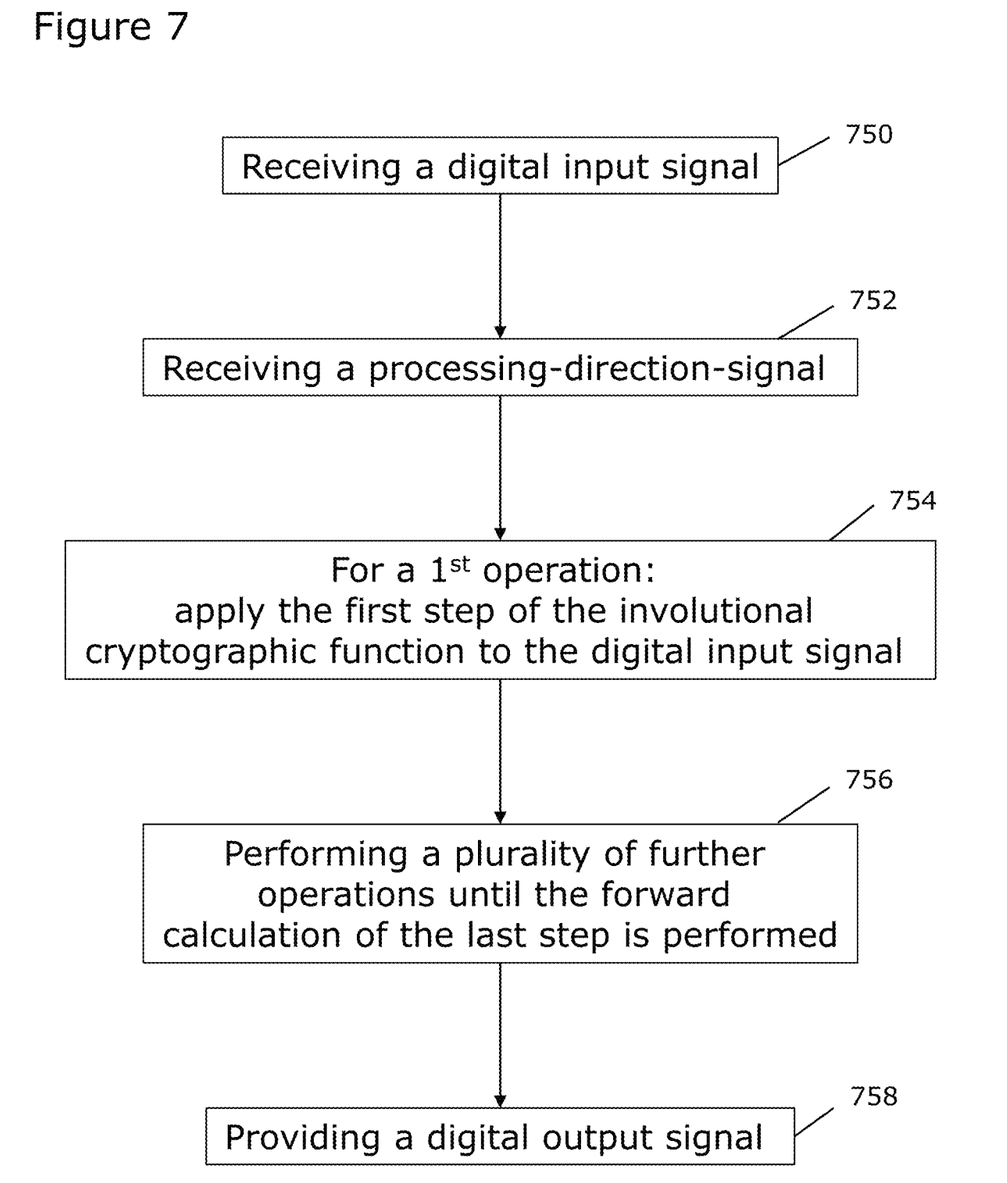
FIG. 7 shows an example embodiment of a computer implemented method of the present disclosure.

FIG. 7 shows an example embodiment of a computer implemented method of the present disclosure. The method can be performed by an apparatus such as an S-box.

At step 752, the method involves receiving a digital input signal that represents a challenge. At step 754, the method receives a processing-direction-signal that can have a forward-value or a backward-value; and At step 756, the method involves, for a first iteration, applying a first step of an involutional cryptographic function to the digital input signal in order to implement a forward calculation to move to the next step in the sequence. Then, at step 756, the method performs a plurality of further operations until a forward calculation of the last step is performed. Further details of these operations are provided above, especially with reference to FIGS. 2 to 4.

Then, at 758, the method provides a digital output signal that represents a response to the challenge.

Examples described herein can involve apparatuses and systems that provide obfuscation of side-channel signals, especially to defy differential side-channel attacks, by using
- an involutional cryptographic function ("Substitution box"/"S-box") on
- one or more modules for performing reversible computing of the S-box function,
- reversing the direction of computation using a True-Random Number Generator.

Such mechanisms can be used stand-alone, or in combination with other security mechanisms.

These examples can be provided as ICs for smartcards and similar applications like secure payment, secure car access etc., especially in cases where an extended security against (differential) side-channel attacks is beneficial.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus configured to:
receive a digital input signal;
receive a processing-direction-signal that can have a forward-value and a backward-value, wherein the processing-direction-signal is used to control a direction of processing, and one of the forward-value and the backward-value of the processing-direction-signal is set according to an output of a random number generator; and provide a digital output signal;

the apparatus comprising:
a processor configured to apply an involutional cryptographic function to the digital input signal, wherein:
the involutional cryptographic function comprises a sequence of processing steps,
the sequence of processing steps comprises a first step, a last step and one or more intermediate steps, and
the steps are reversible such that they can be performed in either:
a forward direction in order to implement a forward calculation to move to the next step in the sequence; or
a backward direction in order to implement a backward calculation to move to the preceding step in the sequence;
wherein the processor is configured to:
for a first operation: apply the first step of the involutional cryptographic function to the digital input signal in order to implement a forward calculation to move to the next step in the sequence; and
perform a plurality of further operations until the forward calculation of the last step is performed, wherein each further operation comprises:
if the processing-direction-signal has a forward-value: then perform the forward calculation for the current step to move to the next step in the sequence by performing a reversible calculation that is associated with the current processing step in a forward direction; or
if the processing-direction-signal has a backward-value: then perform a backward calculation for the current step to move to the preceding step in the sequence by performing a reversible calculation that is associated with the preceding processing step in a reverse direction; and
provide the output of the forward calculation of the last step as the digital output signal when the difference between the number of forward calculations and backward calculations performed by the processor is a predetermined value; and
a program counter configured to count an absolute number of operations taken for calculating the digital output signal, and in response to the absolute number of operations reaching an operation-threshold value: the processor is configured to implement calculations in a single direction for any further operations until the difference between the number of forward calculations and backward calculations performed by the processor is the predetermined value and the digital output signal has been calculated.

2. The apparatus of claim 1, wherein:
the digital input signal represents a challenge; and
the digital output signal represents a response to the challenge.

3. The apparatus of claim 1, wherein the random number generator is configured to set the processing-direction-signal such that it is more likely to have one of the forward-value or the backward-value than the other of the forward-value and the backward-value.

4. The apparatus of claim 1, wherein the apparatus comprises an S-box.

5. A system configured to:
receive a digital system input signal;
receive an apparatus-direction-signal that can have an apparatus-forward-value and an apparatus-backward-value, wherein the apparatus-direction-signal is used to control a direction of processing, and a value of the apparatus-direction-signal is set according to the output of a random number generator; and
provide a digital system output signal;
the system comprising a processor, wherein:
the processor configured to apply a plurality of involutional cryptographic functions to the digital input signal in order to provide the digital system output signal, and wherein each of the plurality of involutional cryptographic functions is performed by the processor, the processor configured to:
receive a digital input signal;
receive a processing-direction-signal that can have a forward-value or a backward-value; and
provide a digital output signal;
wherein:
the involutional cryptographic function comprises a sequence of processing steps,
the sequence of processing steps comprises a first step, a last step and one or more intermediate steps, and
the steps are reversible such that they can be performed in either:
a forward direction in order to implement a forward calculation to move to the next step in the sequence; or
a backward direction in order to implement a backward calculation to move to the preceding step in the sequence;
wherein the processor is configured to:
for a first operation: apply the first step of the involutional cryptographic function to the digital input signal in order to implement a forward calculation to move to the next step in the sequence; and
perform a plurality of further operations until the forward calculation of the last step is performed, wherein each further operation comprises:
if the processing-direction-signal has a forward-value: then perform the forward calculation for the current step to move to the next step in the sequence; or
if the processing-direction-signal has a backward-value: then perform a backward calculation for the current step to move to the preceding step in the sequence; and
provide the output of the forward calculation of the last step as the digital output signal when the difference between the number of forward calculations and backward calculations performed by the processor is a predetermined value; and
the plurality of involutional cryptographic functions comprises a first involutional cryptographic function, a last involutional cryptographic function, and one or more intermediate involutional cryptographic functions;
the one or more involutional cryptographic functions can be performed in either:
a forward cryptographic direction in order to implement a forward cryptographic calculation; or
a backward cryptographic direction in order to implement an inverse of the forward cryptographic calculation;

wherein the system is configured to:
  perform a first apparatus-operation, wherein the first apparatus-operation comprises:
    if the apparatus-direction-signal has an apparatus-forward-value: then perform the involutional cryptographic function on the digital system input signal in the forward cryptographic direction in order to provide a digital apparatus output signal; or
    if the apparatus-direction-signal has an apparatus-backward-value: then perform the involutional cryptographic function on the digital system input signal in the backward cryptographic direction in order to provide a digital apparatus output signal; and
  perform a plurality of apparatus-operations, wherein each apparatus-operation comprises:
    if the apparatus-direction-signal has an apparatus-forward-value: then perform the involutional cryptographic function on the digital apparatus output signal from the preceding apparatus-operation in the forward cryptographic direction to provide a new digital apparatus output signal; or
    if the apparatus-direction-signal has an apparatus-backward-value: then perform the involutional cryptographic function on the digital apparatus output signal from the preceding apparatus-operation in the backward cryptographic direction to provide a new digital apparatus output signal; and
  provide the digital apparatus output signal as the digital system output signal when the difference between the number of forward cryptographic calculations and backward cryptographic calculations is a predetermined value.

6. The system of claim 5, further comprising a single substitution box that is configured to sequentially perform each of the plurality of involutional cryptographic functions.

7. The system of claim 5, wherein the processor is configured to:
  compare the two digital apparatus output signals from different apparatus-operations, wherein each of these two digital apparatus output signals are the result of, on balance, the same number of forward cryptographic calculations or backward cryptographic calculations; and
  if the two digital apparatus output signals are not equal, then the system is configured to reapply the plurality of involutional cryptographic functions to the digital system input signal in order to recalculate the digital system output signal.

8. The system of claim 5, wherein the processor comprises:
  a first-apparatus configured to perform the involutional cryptographic function in the forward cryptographic direction in order to perform the forward cryptographic calculation;
  a second-apparatus configured to perform the involutional cryptographic function in the backward cryptographic direction in order to perform the inverse of the forward cryptographic calculation;
  wherein the apparatus-direction-signal is configured to define a first data flow path through one of first-apparatus and the second-apparatus such that the first apparatus or the second apparatus that is in the first data flow path contributes to calculating the digital system output signal.

9. The system of claim 8, wherein the first or the second apparatus that is not in the first data flow path does not contribute to calculating the digital system output signal.

10. The system of claim 8, wherein the processor further comprises one or more multiplexers configured to selectively include either the first-apparatus or the second-apparatus in the first data flow path based on the apparatus-direction-signal.

\* \* \* \* \*